May 3, 1932.  E. H. CARRUTHERS  1,856,827
BOTTLE CAPPING MACHINE
Filed Feb. 1, 1929   2 Sheets-Sheet 2
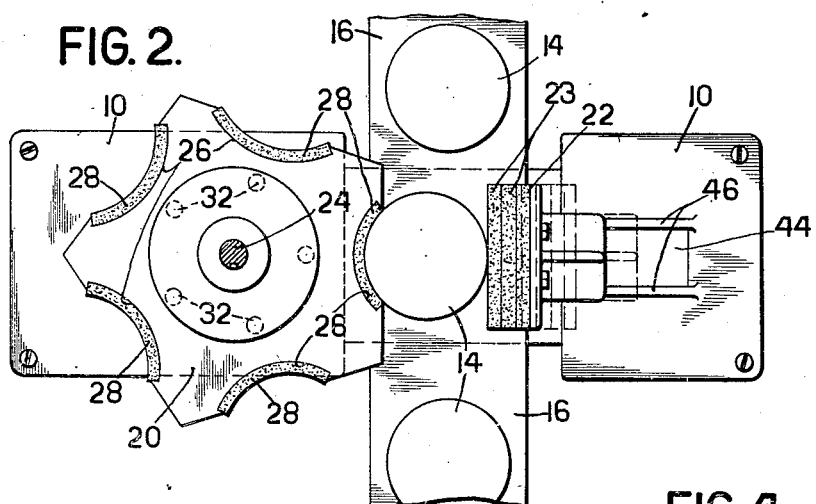
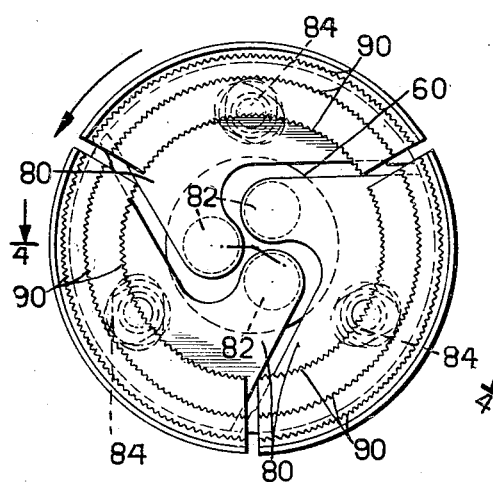
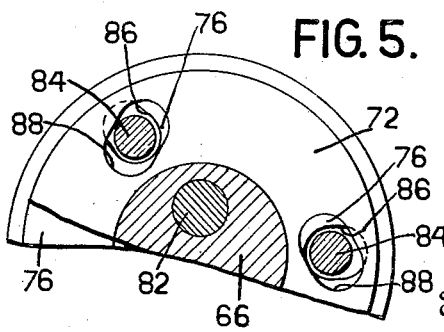
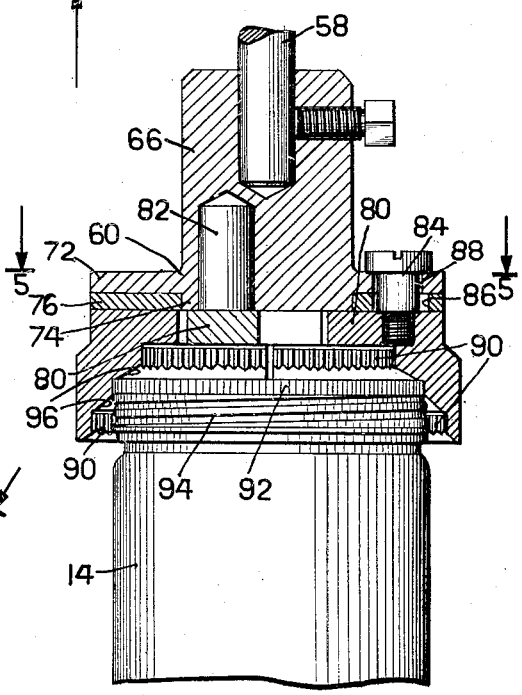
Inventor
E. H. Carruthers
By his Attorneys
Cooper, Kerr & Dunham Patented May 3, 1932

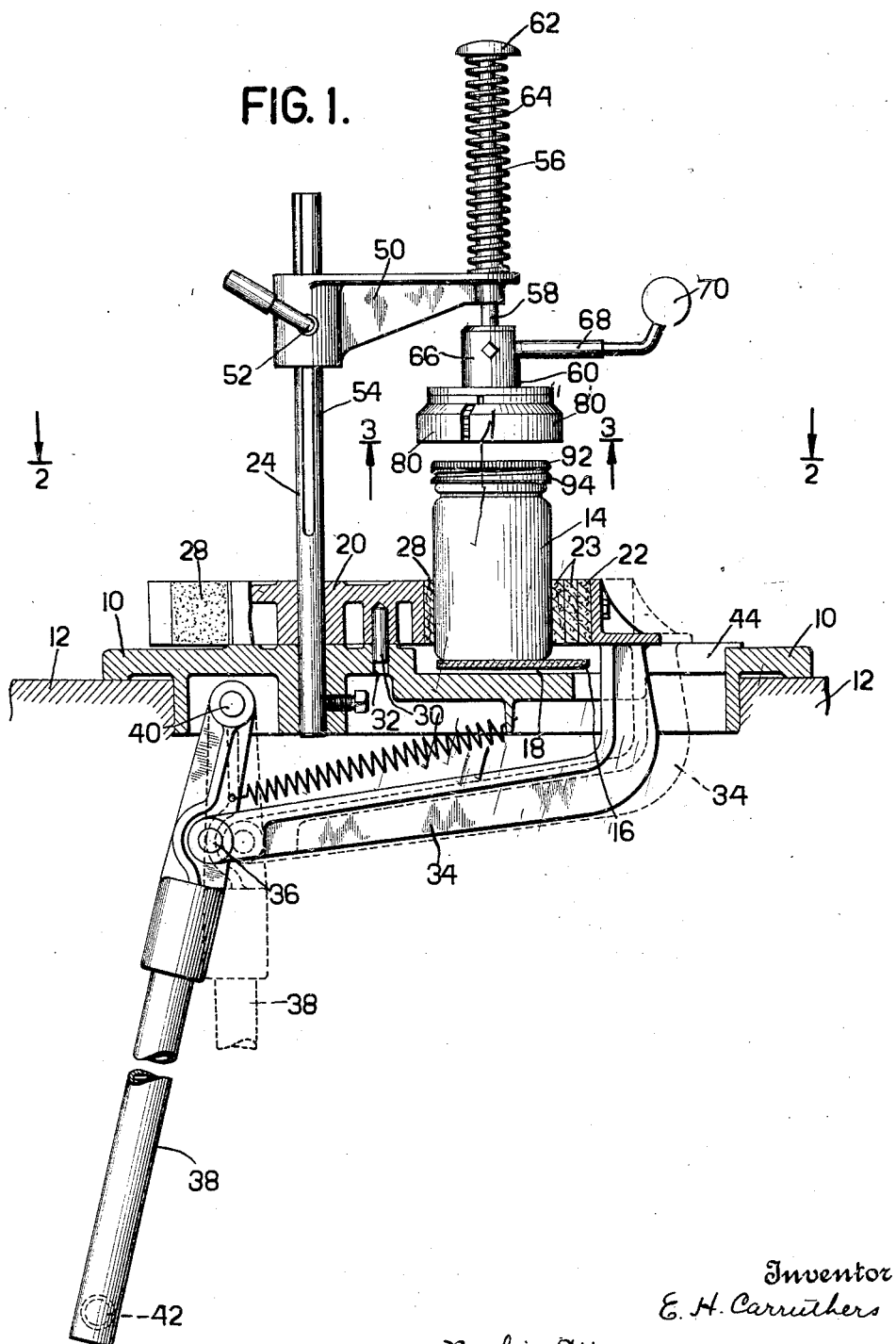

1,856,827

UNITED STATES PATENT OFFICE

EBEN H. CARRUTHERS, OF ASTORIA, OREGON

BOTTLE CAPPING MACHINE

Application filed February 1, 1929. Serial No. 336,719.

This invention pertains to apparatus for applying screw caps to bottles, jars, and receptacles of similar nature.

The object of the invention is to provide a machine of that kind which is simple in construction, easily kept in order, cheap to manufacture, and adapted to readily handle caps and bottles of different sizes.

The above qualifications render my machine especially suitable for the needs of comparatively small concerns that fill and cap only a few bottles of a size at one time. On my machine several sizes of caps may be handled without any change of the chuck, while several sizes of jars or bottles may be handled by a simple adjustment of the turret which may be made instantly.

Further and other objects and advantages will be hereinafter set forth in the accompanying specification and claims, and shown in the drawings which by way of illustration show what is now considered to be the preferred embodiment of the invention.

Fig. 1 is a side view of the machine, partly in section.

Fig. 2 is a view on the line 2—2 of Fig. 1.

Fig. 3 is a view of the chuck, on the line 3—3 of Fig. 1.

Fig. 4 is a cross-section on the line 4—4 of Fig. 3.

Fig. 5 is a detail of the chuck on line 5—5 of Fig. 4 to show slots.

The general arrangement and operation of the machine may be readily understood from Figs. 1 and 2.

The frame 10 of the apparatus is supported on a bench or table 12 slotted to accommodate the lower portion of the frame.

Bottles 14 are supplied to the machine on a conveyor belt 16 adapted to rest on the top of bench 12 and be moved continuously therealong in the direction of the arrow (Fig. 2). The belt passes over the depressed portion 18 of frame 10, as shown in Fig. 1, and brings the bottles one at a time into position to be clamped between turret 20 and movable jaw 22. The turret is mounted for rotation on vertical column 24, held upright in frame 10. The turret is provided on its rim with a number of arcuate recesses 26 lined with rubber shoes 28.

A dowel pin 30, fast in the turret and engaging one of the sockets 32, serves to hold the turret in operative position with any selected one of its recesses in position to cooperate with clamping jaw 22 for the purpose of holding a bottle while its cap is being tightened.

Jaw 22 is shod with rubber or other material 23 suitable for gripping the bottles without breaking or defacing them. Each recess 26 is of such a radius and is so placed as to position and hold a jar of a particular size, in axial alignment with the axis of the chuck above it.

The turret is moved to any selected position by first raising it sufficient to permit pin 30 to clear its socket, then turning the turret until the proper recess 26 is in position, and finally lowering the turret again with the dowel pin entering an appropriate socket 32.

Clamping jaw 22 is provided with a downwardly and rearwardly extending arm 34, pivotally connected at 36 to a depending lever 38 fulcrumed at 40 on frame 10 and fitted at its lower end with a horizontal pin 42 which serves as a foot pedal for the operator.

The upper end of arm 34 passes through a slot 44 in frame 10 and thereby serves to guide the clamp 22 in its back and forth travel. The sides of the slot are raised slightly to provide slides 46 upon which the clamp jaw is supported.

Normally, ever 38 hangs vertical and jaw 22 is out of clamping position, as indicated by dotted lines in Fig. 1. When lever 38 is pushed to full line position by action of the operator's foot on pedal 42, jaw 22 is moved to clamping position and the bottle is held firmly in position to be operated upon by the cap-turning device, which will now be described.

Mounted on column 24 above the turret is a horizontally projecting arm 50 which may be placed at any desired vertical position on the column and there secured by a clamping screw 52 the inner end of which enters slot 54 in the column and serves to hold arm 50 in position to support a vertical guide sleeve 56 through which passes a stem 58, the stem axis being in alignment with the bottle 14 when in operative position.

Fast on the lower end of stem 58 is a chuck designated generally as 60. The upper end of the stem is provided with a cap 62. A compression spring 64 is placed between the cap and arm 50, so as to normally hold the stem 58 and chuck 60 in elevated position.

The upper part of the chuck structure comprises a hub 66 from which projects horizontally an operating arm or handle 68 having a knob 70 at its outer end.

The lower end of hub 66 is provided with an outwardly projecting flange 72 and a downwardly projecting boss 74. A flat ring 76 surrounds boss 74 underneath flange 72. Underneath ring 76 are three arcuate jaw members 80, each fulcrumed on stud 82 projecting upwardly into a socket in hub 66. Set into each jaw 80 is a screw or pin 84, the stem of which passes through a radial slot 86 in ring 76 and a diagonal slot 88 in flange 72 (Fig. 5) whereby each jaw 80 is permitted to rotate slightly about its trunnion 82, at the same time being constrained to swing radially, by the above described slots. Screws 84 serve to hold the parts of the chuck together, but the stem of the screw is of sufficient length to permit free movement of jaws 80 about trunnions 82, within limits set by slots 86 and 88. Slot 88 allows the pin 84 to pass through flange 72 on which the head of pin 84 bears to hold the jaw in place, while slot 86 prevents excessive angular rotation of the pin about trunnion 82 and causes each jaw to take the same amount of movement.

Chuck jaws 80 are provided with three sets of internal teeth or corrugations 90 (Figs. 3 and 4), each set of corrugations being formed to correspond with exterior corrugations 92 on one particular size of jaw cap 94 (Figs. 1 and 4). In Fig. 4 the middle set of corrugations 90 is shown in engagement with a cap. Below each set of corrugations is a conical surface 96 which serves to guide the jaws onto the caps until the proper set of corrugations is aligned with the cap corrugations.

When handle 70 is actuated quickly to rotate the chuck hub 66 counterclockwise as indicated by the arrow in Fig. 3, the inertia of jaws 80 will cause them to lag behind the hub. The jaws are therefore drawn radially inward by studs 82, in consequence of their centers being located eccentrically to center of hub 66, until corrugations 90 of the jaws contact with corrugations 92 of the cap. This contact causes the jaws to lag still farther behind the hub and be drawn still tighter against the cap by studs 82. Further rotation of handle 68 and hub 66 causes the cap to rotate with the chuck. When the direction of rotation of the chuck is reversed, the inertia of the jaws and their engagement with the rim of the jar cap causes the jaws to lag behind the hub with the result that studs 82 move the jaws outwardly and the chuck is released from the cap.

With the above mechanism in mind, the operation of the entire machine will be readily understood. Filled bottles are placed one by one on belt 16 with their caps started in place on the screw threads of the jar. As each such jar reaches the position opposite the center of the turret, the operator with his foot on pedal 42 pushes lever 38 to the rear causing jaw 22 to clamp the jar against the turret in axial alignment with the chuck above it. The operator with his hand on knob 70 of arm 68 first draws the chuck downwardly until the chuck jaws engage the cap, and then quickly rotates the chuck to tighten the cap. When pressure on knob 70 is released, the chuck is raised clear of the cap by spring 64.

In practice, arm 50 is set at such a height on column 24 that there is very little clearance between the top of the cap and bottom of the chuck. Therefore slight vertical movement of the chuck is required. As a matter of fact the vertical movement is so slight that the lowering and rotating of the chuck are done by one continuous movement.

After a cap is tightened on its jar, clamp 22 is released and the jar is carried away by belt 16 which is in continuous motion.

It is to be understood that the invention is not limited to the specific apparatus and procedure herein described but may be carried out in various ways without departure from its spirit as defined by the appended claims.

I claim—

1. In a bottle capping machine, in combination, a chuck supported for rotation on a vertical axis, and a clamping device operable to hold a bottle in alignment with said chuck axis, said device comprising a movable jaw and a member having a plurality of recesses of different sizes, said member being adjustable to cause any selected recess to cooperate with said jaw whereby bottles of different diameter may be clamped in axial alignment with said chuck.

2. The invention set forth in claim 1 in which said member comprises a rotatable turret and the recesses are arcuate, the radial center of each recess while in clamping position being at the chuck axis.

3. In a bottle capping machine, clamping means for holding a capped bottle against rotation, in combination with a chuck having a hub with a plurality of freely movable jaws pivoted to said hub, and means for rotating said hub, to first cause said jaws to draw into contact with the cap and then screw the cap on the bottle, substantially as described.

4. In a machine for screwing corrugated caps onto bottles, in combination, a frame, means mounted on the frame for holding the bottle against rotation, a chuck provided with jaws having internal corrugations corresponding to those of the cap, and a single means for first placing the chuck on the cap, and then rotating the chuck to cause its corrugations to engage the cap corrugations to rotate the cap relatively to the bottle.

5. In a machine for screwing corrugated caps onto bottles, in combination, a frame, means mounted on the frame for holding the bottle against rotation, a chuck provided with freely movable jaws having internal corrugations corresponding to those of the cap, and a single means for first placing the chuck on the cap and then rotating the chuck to cause its corrugations to engage the cap corrugations, to rotate the cap relatively to the bottle, and finally for releasing the chuck from the cap.

6. In a machine for screwing a cap onto a bottle, in combination, means for holding the bottle against rotation; a chuck having a hub and a plurality of freely movable jaws pivoted to said hub; a single means for placing said chuck with its jaws surrounding the cap and for rotating said hub, and means on said hub and effective only when said hub is rotated for constraining said jaws to close on the cap and grip it tightly, whereby further rotation of the hub will rotate the cap.

In testimony whereof I hereto affix my signature.

EBEN H. CARRUTHERS.